May 14, 1935.  J. H. BOOTON ET AL  2,001,653
REVERSE PLATING
Filed Feb. 14, 1934  4 Sheets-Sheet 1
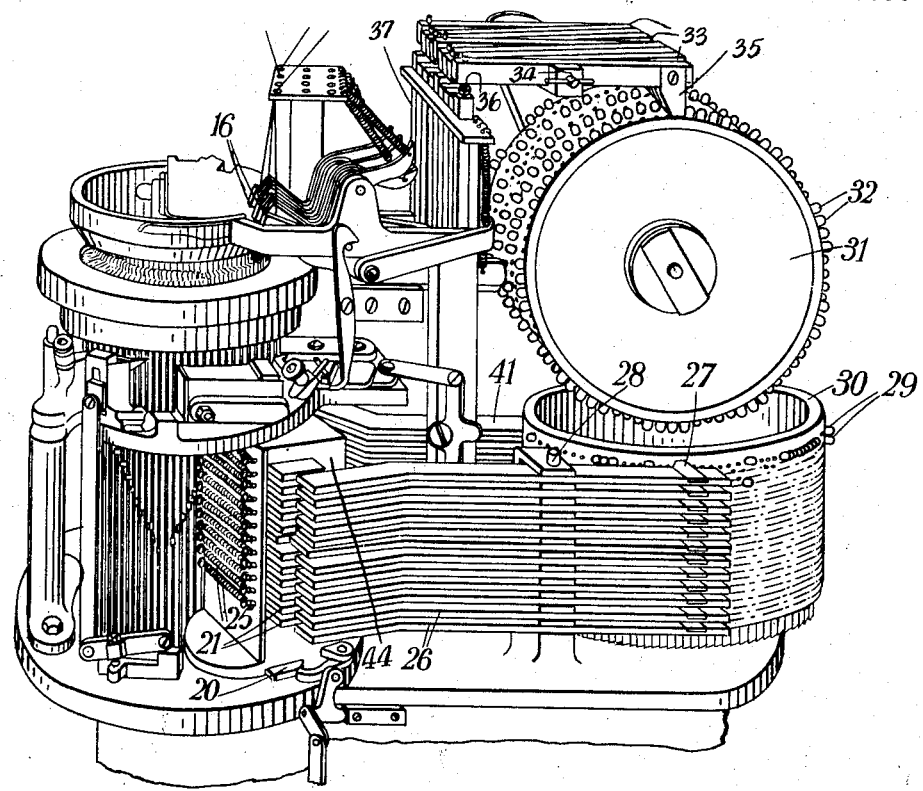
Fig.1.
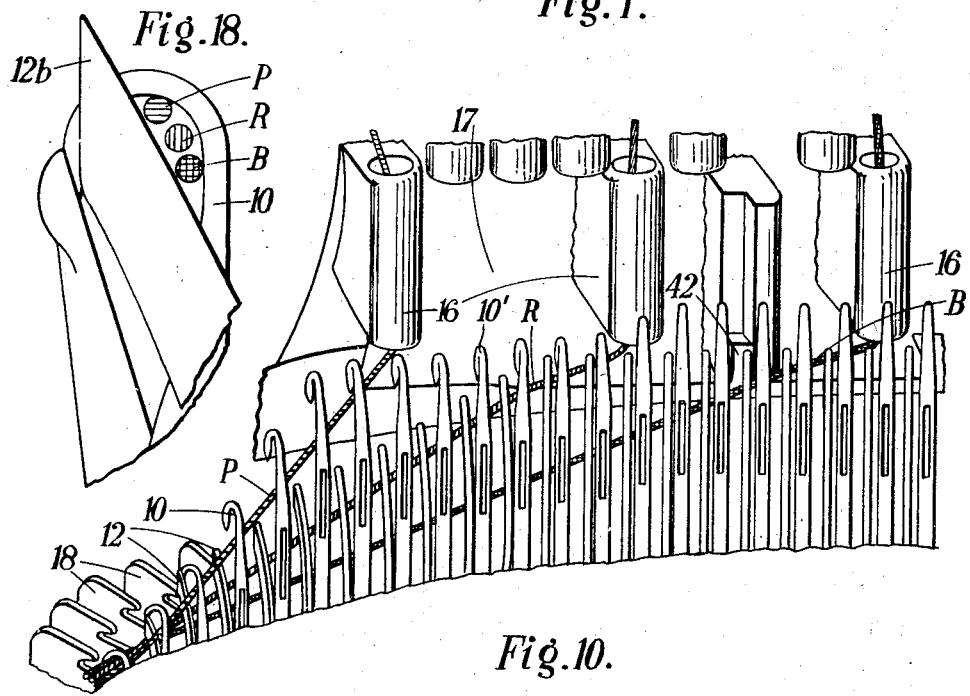
Fig.18.
Fig.10.
Inventors
John Howard Booton and Herman Booton
By Busher & Collings
Attys.

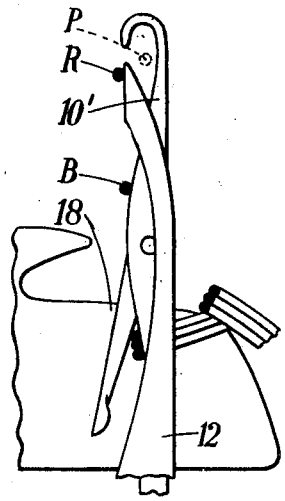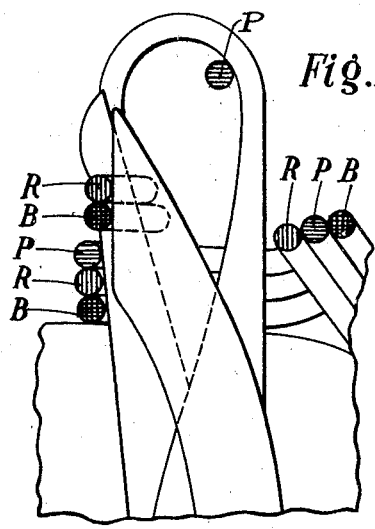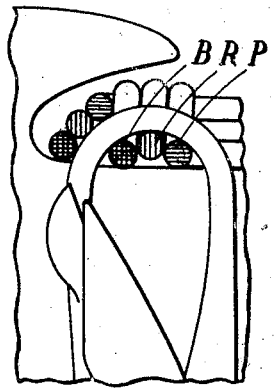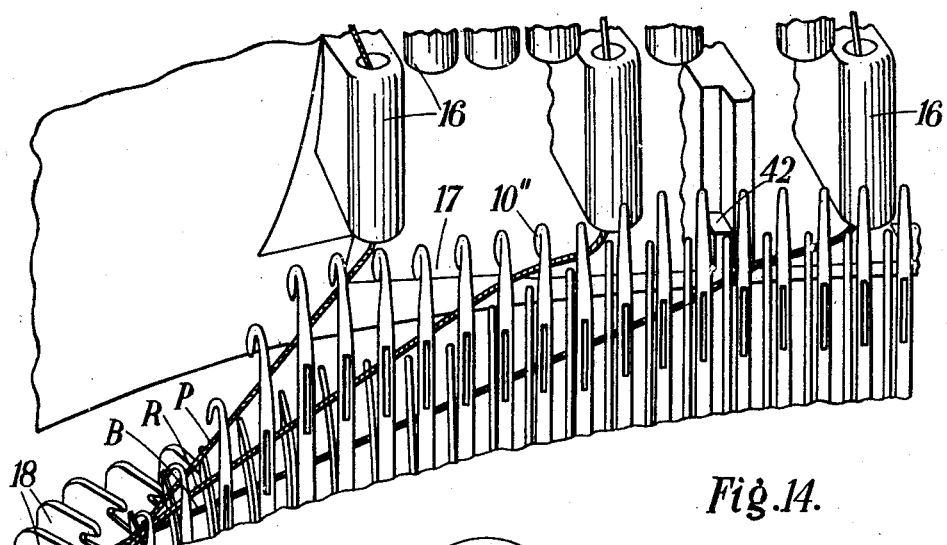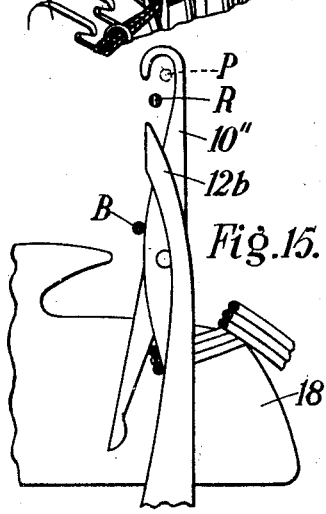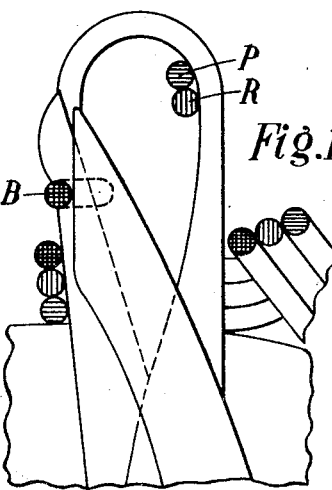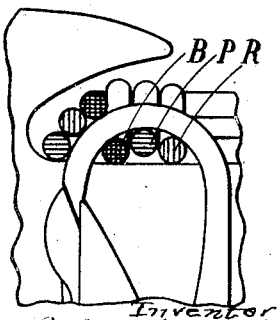

Patented May 14, 1935

2,001,653

UNITED STATES PATENT OFFICE 2,001,653

REVERSE PLATING

John Howard Booton and Herman Booton, Leicester, England

Application February 14, 1934, Serial No. 711,252
In Great Britain July 30, 1932

19 Claims. (Cl. 66—90)

This invention is for reverse plating, both for what is known as two-colour reverse plating and for what is known as three-colour reverse plating. Although broadly applicable to all knitting machines employing hooked needles, the invention is chiefly concerned with independent needle machines, more particularly latch needle machines and machines having a circular series of needles.

An object of the invention is to provide a simple process, method, and mechanism by which a plurality of yarns fed to the needles in plating relationship may have their relative positions at all times definitely or positively determined so that clearly defined and positive plating is provided, and the possibility of uncertain or promiscuous plating eliminated. Another object of the invention is to provide in plating mechanism means whereby the relation of the yarns is controlled to a later stage in the knitting process than heretofore. A further object is to provide simple and effective reverse or change-over plating mechanism, and means and a method whereby the thread reversal is positively or definitely effected at any selected or predetermined needle, thus enabling a wide range of clearly defined plated patterns to be produced.

The present invention is based upon the positive manipulation and positioning of the yarns within the needle hooks, whereby the yarn that is desired at the front of the fabric at any loop may be so placed in the hook in relation to the other yarn or yarns as to become the face or plating yarn; this is effected by interposing instruments between the yarns to separate them, employing for this purpose novel instruments and a novel mounting therefor.

An embodiment of the present invention as applied to a circular knitting (seamless half hose) machine will now be described in detail, by way of example, with reference to the accompanying drawings in which Figure 1 is a general arrangement showing the relevant parts of the machine.

Figure 10 is a perspective view of a portion of the needle cylinder illustrating the action of the instruments, during three-colour reverse plating, in order to bring one selected thread to the face of the fabric.

Figures 11 to 13 illustrate the relation of the instruments, needles, and the three threads, during this selection.

Figure 14 is a perspective view of a portion of the needle cylinder illustrating the action of the instruments, during three-colour reverse plating, in order to bring a further selected thread to the face of the fabric.

Figures 15 to 17 illustrate the relation of the instruments, needles, and threads, during this selection, while Figure 18 illustrates the manner in which the instruments may be employed to hold the threads in the relation in which they are fed to the needles during plain plating on three threads.

Throughout this description like reference numerals indicate like parts.

It is convenient first to describe the invention as applied to two-colour plating, this application of it being particularly illustrated in Figures 1 to 9 inclusive.

Figure 2:
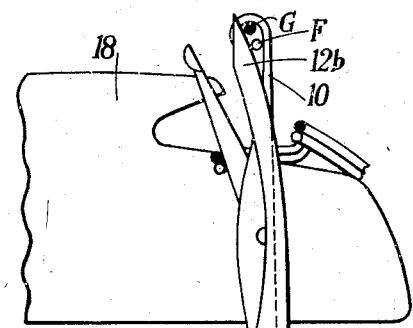
Figures 2 and 3 illustrate the relation of the plating instruments, needles and two threads during plain plating.
Figure 3:
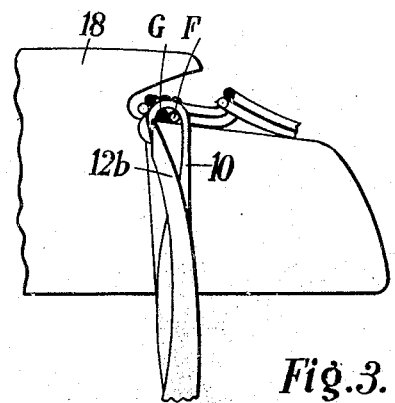
Figure 9:
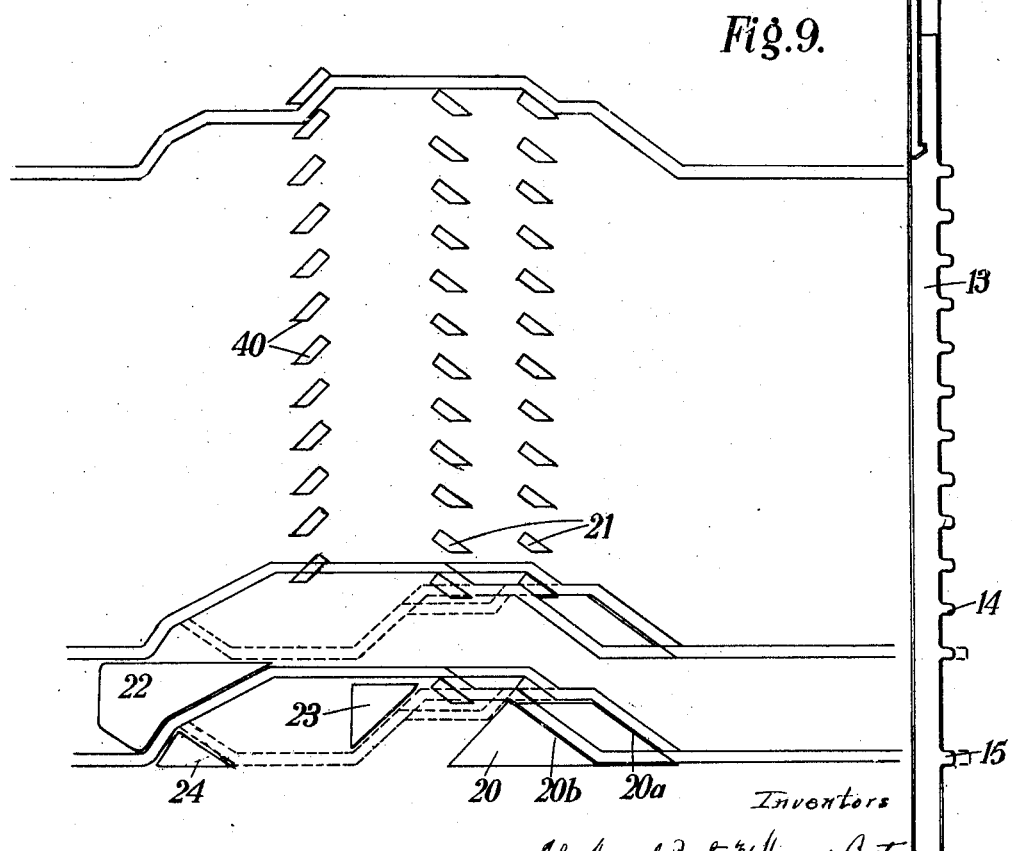
Figure 9 shows the instruments and the cams by which they are selected and operated.

Each of the latch needles 10 in the cylinder 11 is provided with a plating instrument 12, an elevation of which is given in Figures 2 and 9. This instrument, which is conveniently termed a "spear" because of its shape, is arranged to work in the same trick as the associated needle, preferably at the back of the needle and is provided with a head which is cranked sideways about the point 12a so that it lies alongside the head of the needle. The head of the spear is provided with an attenuated point 12b, which is curved forwards and upwards and is employed to separate the threads during reverse plating, and to cause them to reverse their positions.

Figure 4:
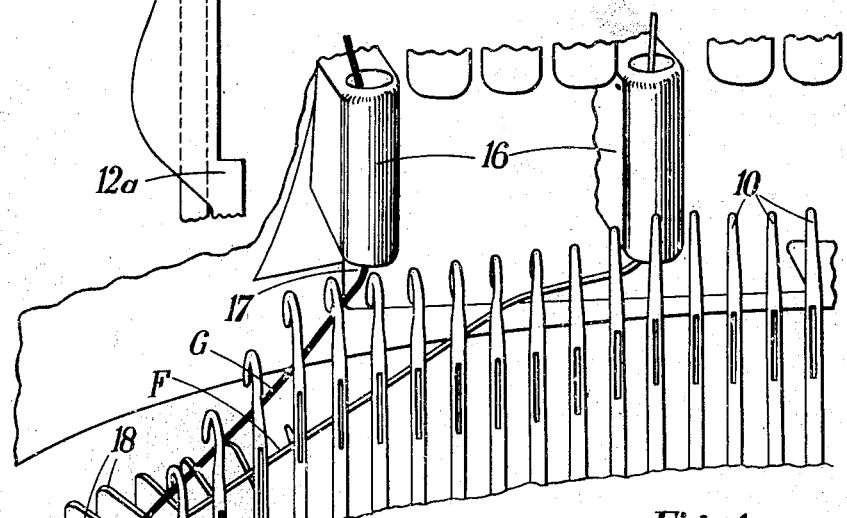
Figure 4 is a perspective view of a portion of the needle cylinder further illustrating the action, as regards two threads only, during plain plating.

Each instrument is attached at its lower end to a jack 13, Fig. 9, which jack is provided with a plurality of selecting butts 14 (or with such a butt at any of a plurality of positions in its length) and a lower butt 15 which is engaged by certain cams hereinafter described to bring the butts 14 into the range of a battery of selecting cams 21. The two threads to be knitted, which will conveniently be termed "black" and "white", and lettered respectively G and F, are fed from two of a plurality of movable feeders 16 and they pass through a throat 17 at slightly different angles, as is usual in plating. Therefore normally the black thread will be fed across the needles (above the latches) at a higher level than the white thread, as is shown in Figure 4. The result of this is that when a needle descends to draw loops from the threads over the associated sinker 18, the white thread F is moved up behind the black or ground thread G as is shown in Figure 2.

Figure 5:
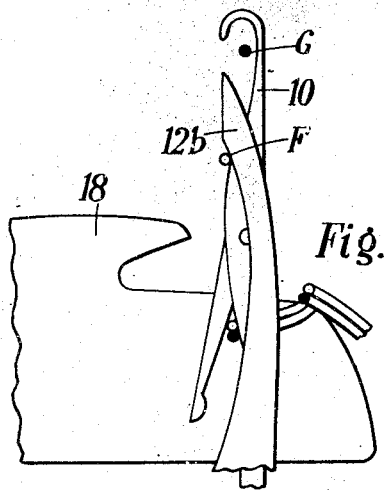
Figures 5 to 7 illustrate the relation of the instruments, needles and threads during two-colour reverse plating.
Figure 6:
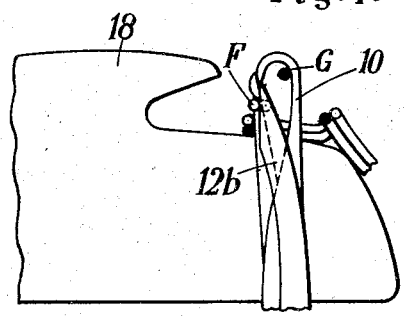
Figure 7:
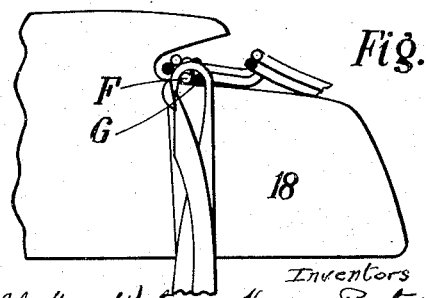
Figure 8:
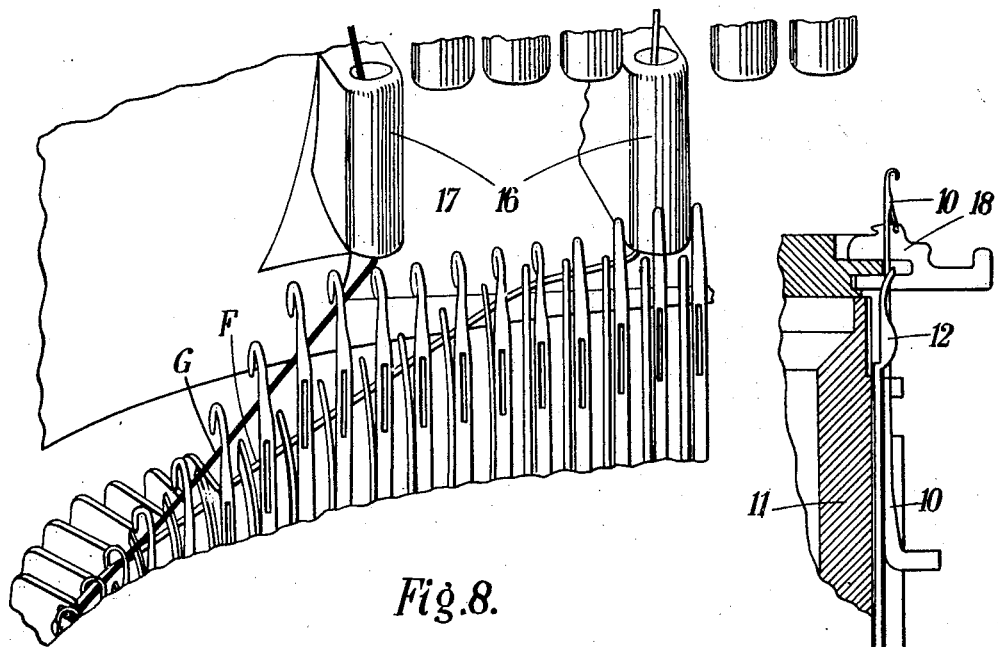
Figure 8 is a perspective view of a portion of the needle cylinder further illustrating the action during two-colour reverse plating.

For reverse plating, Figs. 5 to 8, it is necessary to reverse these two final positions. Therefore, a spear 12 as described above is employed. As the needles at which the plating is to be reversed approach the feeding position the spears associated therewith are raised so that each spear receives the white thread at its front edge as is shown in Figure 5 and at the right hand side of Figure 8. After receiving this thread, the instrument is lowered by a cam which acts on the bottom butt 15, in a path which is substantially parallel with that of the white thread, so that the black thread passes into the needle hook as is shown in Figures 5 and 8 and misses the tip of the spear. The said spear is therefore located between the two threads so that they are positioned positively. The needle then descends to draw its loop over the associated sinkers 18 and as it does so the forwardly inclined tip of the spear 12 ensures that the white thread is guided to the front of the black thread as is shown in Figures 6 and 7. The progressive movement of the white thread from its position below the black thread to a position in front of it is also shown in Figure 8. The downward movement or retraction of the spear is slower than that of the associated needle until the knocking over position is reached or almost reached, after which said spear is rapidly withdrawn from between the threads. In this way the spear positively controls and determines the relative disposition of the two threads on the associated needle until knocking over is accomplished or about to be accomplished.

The tip of the spear 12 is conveniently in vertical alignment, or approximately so, with the point of the needle hook, when viewed as represented in Fig. 5, and it will be appreciated that, by reason of the head of the spear being alongside and slightly spaced laterally from the needle, the white thread, which is pushed forward by said head during needle retraction, is enabled to pass between said head and the needle latch to the back or inner side of said latch when the latter is closed by the old thread loops. Thus the said white thread is forced by the spear head up the inner side of the closed or closing latch (Figure 6) so as to take up a position in front of the black thread in the needle hook when the spear head is withdrawn, (Figure 7) thereby reversing the normal relative positions of the threads, and bringing the black thread G to the face of the knitted fabric.

It will be seen that it is impossible for the two threads accidentally to change their relative positions and a very good colour definition is thereby obtained in the fabric. This definition is also materially assisted by employing the spears to hold the two threads in their desired relationship during plain plating. For this plain work, the spears are not raised at the feeder, as will be seen by studying the needles shown opposite the throat in Figure 4, so that the two threads are fed across the needles above the latches with the black thread uppermost and slightly in advance. The needles are then lowered to draw their loops. Just before each needle draws its loop over the associated sinkers, however, the spear 12 co-operating therewith is raised a short distance to hold the white facing or plating thread F back against the needle as is indicated in Figure 2 (this movement of the instruments is also shown in Figure 4). This white thread is, therefore, definitely prevented from moving forward and is guided up into its correct position behind the black thread (see Figure 3). Subsequently, the partially raised spear is withdrawn rapidly at or about the period when the old loop is knocked over, as is the case when reverse plating.

The operating and selecting mechanism may be of any convenient kind and that shown in the accompanying drawings is merely given as an example which has been found suitable. The lower butts 15 of the jacks 13 pass along a track which brings them against what may be termed a "preparing cam" 20. This cam raises the jacks to the height at which the butts 14 are brought within the range of a battery of selecting cams 21. The said cams 21, of which there is one for each level whereat butts 14 are provided on the jacks, are movable radially of the cylinder by selecting mechanism hereinafter described. If a butt 14 on a jack which has been raised by the preparing cam 20, is engaged by one of these selecting cams 21, the said jack is raised still further at a point in the needle circle adjacent the needle throat to bring the spear to the reverse plating position shown for example in Figure 8. Subsequently the bottom butt 15 of the jack is engaged by a downthrow cam 22, the angle of which approximates to the angle of feed of the white thread, and the instrument is lowered, the final downward motion which is imparted by this cam being comparatively rapid and occurring at or about the knocking-over point.

If, when a jack is raised by the preparing cam 20, it is not lifted further by a selecting cam 21, as will be the case in plain plating, the lower butt 15 of that jack is engaged by an early downthrow cam 23 and is retracted. At or about the time the associated needle draws its loop, however, the butt 15 of the said jack is engaged by a small upthrow cam 24 and raised to bring the spear to the position shown in Figure 2, at which the tip 12b holds the threads in their normal plating position. This spear is subsequently lowered rapidly by the cam 22.

As is hereinafter described the selecting cams 21 are movable radially of the machine to select the instruments and are slidably mounted in a block 44, being biased towards their outer position by tension springs 25.

Having now described the invention as applied to two-colour reverse plating, it will now be further described as applied to three-colour reverse plating with particular reference to Figures 1, 9, and 10 to 18.

As will be appreciated from the foregoing, two-colour reverse plating is effected by taking at will either none or one of the threads on the fore-part of the instrument associated with a particular needle. An elaboration of this principle is used for three-colour reverse plating, for the instruments are operated selectively to take either none, one or two of the threads.

Turning to Figure 10, three threads, which can conveniently be termed peach, red and black, (and are therefore lettered P, R, and B) are fed from feeders 16 through the throat 17 to the needles 10 in a certain plating relationship, at different angles or from different heights in known manner, such that the peach yarn P is uppermost, the black yarn B lowermost (the latter being fed from the feeder which is farthest from the stitch cam) and the red yarn R at the middle. Unless this relationship is modified, it results in the black yarn B appearing at the face of the fabric and the peach yarn P at the back. If it is desired to bring the peach yarn P to the front of the fabric, an instrument is inserted so that the peach yarn is held at the back of the hook and the red and black yarns are held to the front thereof, as is shown in Figures 10 to 13. If it is desired to cause the red yarn R to appear at the face of the fabric an instrument, which may be the instrument referred to in the preceding sentence, is inserted between the black and red yarns, so that the peach and red yarns are held to the back of the needle hook and the black yarn to the front as is shown in Figures 14 to 17. As in the case of two-colour reverse plating, the instruments are selected for operation to bring or cause the required thread to appear at the face of the fabric by means of their butts 14 and the battery of selecting cams 21. When it is desired to bring the peach yarn to the front, the required instrument, having been raised by the preparing cam 20, is further raised by one of the selecting cams 21 to the height illustrated in Figure 10 at which it continues round past the throat 17 so that the two yarns B and R are laid in the front of it, as is more clearly shown in Figure 11. Before the instrument reaches the peach yarn P, however, it is retracted by the cam 22 which operates upon the lowermost butt 15 of the associated jack 13, so that the said yarn P is laid directly into the needle hook.

It may here be mentioned that the needle illustrated in Figure 11 is that needle which is at the positioin mark 10¹ in Figure 10, and hence as at that position the yarn P has not been laid in the needle hook, the eventual position at which said yarn is laid is represented in Figure 11 by a dotted circle.

After the yarns have been separated and caused to take position in the needle hook in this manner, the needle descends to draw its loop over the associated sinker 18 and the spear is moved with it by the cam 22 so that because of the shape of the tip of the spear, the two yarns B and R are pushed right to the front of the hook (as is the single yarn in two-colour reverse plating) and are held separated from the peach yarn P while the needle descends below the sinker. As a result instead of the black yarn appearing at the face of the fabric, the peach yarn appears at the face and the black at the rear. It will be noted that the downward movement of the spear is somewhat slower than that of the needle until the knocking over position is reached or almost reached, (when the sinkers move forward to knock over the old loop), after which the instrument is rapidly withdrawn from between the threads by the lower part of the cam 22.

When it is desired to bring the red yarn to the face of the fabric at any needle, the appropriate instrument is selected and raised as before by the cams 20, 21 so that the black yarn B is laid across in front of it as shown in Figures 14, 15. Before the needle and instrument reach the feeder for the red yarn R, however, the instrument is retracted slightly so that the red yarn is laid into the needle hook as is shown in Figure 15 (in which figure the peach yarn is again represented by a dotted circle because the needle illustrated is that shown at position 10¹¹ in Figure 14, at which position the peach yarn has not been fed).

As any instrument must be capable of engaging the red yarn or of missing it, selective means must be provided for retracting the instruments. These selective means operate upon the butts 14 of the jacks and comprise a further battery of what may be termed "deselecting" cams 40, which are shown in Figure 9, and which like the cams 21 are movable radially of the machine to lower the instruments and are slidably mounted in a block, being biased towards their outer position by tension springs. By one of these cams 40, the instrument is lowered at substanitally the same angle as the red thread until the said red thread is laid past its tip into the needle hook, as is shown in Figure 15. The instrument then passes from the control of the cam 40 and hence continues round at the same level towards the peach thread P. Before it reaches the said thread, however, the lower butt 15 of the associated jack 13 is taken by the cam 22 so that the instrument is lowered to miss the peach thread, as hereinbefore described, the said peach thread is therefore laid into the needle hook. During the retraction of the needle, and of the associated instrument by the cam 22, the black thread is urged to the front of the needle hook as shown in Figure 16, so that it takes up a position in front of the peach and red threads which latter also assume the position shown. The result of this is that instead of the black thread appearing at the face of the fabric that thread which is now the lowest of those at the back of the needle hook, i. e. the red thread, appears at the face.

In this manner, the instruments control the threads down to or almost down to knocking over point.

It will have been appreciated from the foregoing description that either of two threads is brought to the face by positive manipulation of the threads by the spears or plating instruments, but that when the third thread is required at the face the plating relation in which the threads are initially fed is not modified by the instruments. With reference to two-colour reverse plating mention has been made that the instruments may be used to hold the threads in the plating disposition in which they are fed to the needles. This is also an optional feature of the present invention as applied to three-colour reverse plating. When the black thread is to be brought to the face of the fabric, the plating relation in which the threads are fed to the needles is not modified. Hence, although all instruments are raised by the preparing cam 20, they are none of them raised further by the selecting cams 21 but are retracted by the early downthrow cam 23, which engages the preparing butts 15. If the instruments are to be employed positively to hold the three yarns in their normal plating relationship, a small upthrow cam 24 is also provided as in the two colour reverse plating mechanism. This cam 24 is so located beyond the downthrow cam 23 that it engages the preparing butts 15 of the retracted jacks and lifts the associated instruments about the time that the associated needles draw their loops. Therefore the instruments enclose the three threads in their fed relation at the back of the needle hooks, as is illustrated in Figure 18. The instruments are then rapidly lowered by the second downthrow cam as hereinbefore described.

Having now described the manner in which the instruments function, it is now convenient to describe the selecting mechanism. Associated with each of the selecting cams 21, there is a lever 26. This lever is pivoted intermediate of its ends at 28, one of which ends bears against the associated selecting cam 21, while the other end is provided with a feeler 27 cooperating with studs 29 in a pattern drum 30 or other patterning device. This pattern drum is racked periodically by any suitable mechanism and its function is to rock the levers 26 selectively and thereby to introduce the selecting cams 21 at appropriate periods, determined by the manner in which the studs 29 are arranged, so that spears are selected and raised to reverse plating position.

The de-selecting cams 40 (employed only for three-thread work) are similarly moved by means of a battery of horizontal levers 41 shown in Figure 1, which levers are also worked by studs upon the pattern drum 30.

The said pattern drum 30 is supported for movement about a vertical axis and above it there is a further pattern drum 31 provided with studs 32 and movable about a horizontal axis, which drum 31 is also racked periodically. This drum 31 is employed to select the feeders 16 whereby they may be changed at will to substitute other threads for those hereinbefore mentioned, the said feeders being in excess of the number of threads that it is desired to feed in plating relationship to the needles at any one time. Such selection is conveniently effected through the medium of a battery of substantially horizontal levers 33. These levers are pivoted at 34 and at one end each lever carries a feeler 35 for engaging the corresponding studs and at the other end carries an adjusting screw 36 bearing upon a push rod 37 which rod is pressed when the lever is rocked to move the associated feeder 16.

In connection with this selection of feeders, (by which six or more coloured yarns may be brought to the front of the fabric in any one course) attention is directed to the shape of the throat 17 shown in those figures of the drawings which particularly illustrate three-colour reverse plating. It will be seen that the sill of the throat is not level, but inclines downwards from its corner nearest the stitch cam, over which corner the peach yarn P runs, to a point intermediate of its length, at which point the red yarn R is fed, while towards the other end of the throat there is an upstanding division 42 and the black yarn B is fed at the far side of this division. The purpose of this division is to maintain sufficiently widely spaced apart, to define their plating relation, the two yarns (such as B and R) which are fed from the right hand part of the throat when, as may happen a particular selection of feeders is made, these two yarns are fed from adjacent feeders. Attention is directed to the fact that this division, being mounted like the feeders 16 and movable by a suitable control such as the drum 31, is capable of being raised out of operative position. This movement is necessary because otherwise, during the production of the heel and toe when some half of the needles are held raised, it would catch and break the latches of said needles.

Means are provided for throwing the reverse plating mechanism out of operation, such as is necessary, for example during the production of a foot bottom and instep of seamless hose. Therefore the cams 20 and 24 are movable radially of the cylinder, for example under the control of the cam drum, so that none of the jacks and associated spears are raised. The reintroduction of these cams is facilitated by providing a small group of jacks with short bottom butts 15 and by providing the preparing cam 20 with two inclines set at different radii from the cylinder. The first incline 20a engages only the long butts and misses the short butts, while the second incline 20b engages the short butts, so that when the cam 20 is reintroduced all the long butt jacks are first lifted by the incline 20a to clear a space sufficient to permit of the complete introduction of the cam.

By the means described herein reverse plating can be effected with a facility not permitted by machines hitherto devised, and a very wide patterning range is provided by reason of the battery of selecting cams 21 and butts 14 (there may be such butts at 12 levels) and the number of interchangeable feeders 16.

We claim:—

1. That process of producing plating and reverse plating upon a series of hooked needles which comprises feeding at least three threads to the needles, in a plating relation, and in knitting three threads in said relation at certain wales, changing said relation at other wales by positively separating the thread that is to appear at the face of the fabric from the others and maintaining such separation during loop formation, knitting the three threads in such wales in said changed relation, making a further change in the plating relation, and knitting at least one loop from threads in said further relation.

2. That process of producing upon a series of machine needles plated knitted fabric containing loops each comprising three yarns in plated relation, each of which yarns appears at the face of at least one of the said loops, which process comprises feeding the three yarns to the needles in a certain plating relation, knitting at least one loop from the three yarns in that relation, changing the relation of the yarns by separating in the needle hook two from the third and knitting at least one loop from the three yarns in said changed relation, and in making a further change in the plating relation of the yarns and knitting at least one loop from the three yarns in said further relation.

3. That process of producing upon a series of machine needles plated knitted fabric containing loops each comprising three yarns in plated relation, each of which yarns appears at the face of at least one of the said loops, which process comprises feeding the three yarns to the needles in a certain plating relation, knitting at least one loop from the three yarns in that relation, changing the relation of the yarns by separating in the needle hook two from the third and knitting at least one loop from the three yarns in said changed relation, and in making a further change in the plating relation of the yarns by separating in the needle hook two yarns, one of which is the said third yarn, from the other, and knitting at least one loop from the three yarns in said further relation.

4. For an independent needle knitting machine having needles, means for feeding a plurality of threads thereto in plating relation, and means for operating the needles to knit the threads into plated fabric, reverse plating mechanism comprising movable instruments having attenuated points, each of which instruments is associated with a different needle, and means for moving each instrument to either of two alternative positions, in one of which positions the point is interposed between two threads to separate them one to the front and the other towards the back of the hook of the associated needle, and in the other of which positions both threads are enclosed between a rear edge of said point and the back of the hook.

5. For a knitting machine having needles, means for feeding at least three threads thereto in plating relation, elements between the needles across which sinker loops are formed in knitting means for knitting the threads upon the needles into plated fabric, reverse plating mechanism comprising thread engaging instruments for controlling the plating relation of the threads upon the needles, there being an instrument to each needle whereat a change-over in plating is to be effected, and means for operating said instruments to maintain positive control of the relative disposition of the thread which is to appear at the face of the fabric separate from the other threads substantially down to knocking over and thereafter to release the threads from such control.

6. In an independent needle knitting machine having a tricked needle bed, needles therein, means for feeding threads in plating relation to them, and means for operating said needles to knit plated fabric from the threads, reverse plating mechanism comprising thread-engaging plating instruments that are mounted to slide in the needle tricks, and means for moving said instruments to control by direct engagement the plating relation of the threads taken by the needles in the tricks in which they slide.

7. For an independent needle knitting machine, particularly a latch needle machine, having needles, means for feeding a plurality of threads to them, sinkers or web holders and means for operating the needles to take the threads in their hooks and knit them into plated fabric, mechanism comprising instruments, associated each with a needle, having attenuated points lying alongside the needle hooks in planes between the needles and the sinkers, means for moving said instruments to positions whereat at least one of the fed threads is progressively laid across the front of said instruments and is thereby held to the front of the hooks of the associated needles while being knitted and means for causing the instruments to accompany the needles in their movements below the sinkers.

8. A knitting machine having a tricked needle bed, needles working in the tricks, means for feeding a back thread and a face thread to the needles, means for operating the needles to knit said threads into plated fabric, thread-engaging instruments mounted alongside the needles in said tricked bed and each cooperating with the adjacent needle, for engaging the threads and causing them to change their positions in the production of reverse plating, and patterning means for selecting the instruments for operation in this manner.

9. In a knitting machine, a tricked needle bed, needles reciprocatable therein, means for feeding a back thread and a face thread to the needles, selectable thread-engaging instruments mounted for sliding movement in the needle tricks for engaging the threads and changing their positions in the production of plating and reverse plating, and means for operating the needles to knit said threads into plated fabric.

10. In an independent needle knitting machine having a bed in which needles are mounted for knitting, and means for feeding a plurality of threads to the needles to be knitted by them into plated fabric, reverse plating mechanism comprising instruments associated one with each needle and mounted for movement longitudinally thereof, each of which instruments has a thin forwardly directed extremity alongside the needle head, and means for moving selected instruments to a position whereat one thread is received on the forward edge of said extremity and is subsequently enclosed between said edge and the closing part of the needle and another thread is not so engaged by said tip but is enclosed by the tip to the rear of the hook, whereby the positions of the two threads are reversed.

11. In the combination claimed in claim 10, a stitch cam for retracting the needles in knitting, means for projecting the selected instruments to take thread in the manner specified and for retracting said instruments substantially with the retraction of the needles by the stitch cam, and also means operable to project the instruments associated with the other needles (at which needles, the threads are to retain their normal plating relation) in such manner that as said needles complete their draw the threads in the hooks thereof are retained in their normal relation and are prevented from reversing.

12. In a knitting machine having needles, means for feeding at least three threads thereto in plating relation, sinkers and means for knitting plated fabric from said threads, thread engaging instruments associated with the needles, and means for operating the said instruments to change the relation of the threads by engagement therewith to cause each thread in turn to appear at the face of the fabric.

13. In a knitting machine having needles, means for feeding at least three threads thereto in plating relation, and means for knitting plated fabric from said threads, thread engaging instruments associated with the needles, means for moving certain instruments to separate in the needle hooks one thread from the others and for moving certain instruments to separate a different thread from the others, whereby each thread in turn is brought to the face of the fabric.

14. In a knitting machine having needles, means for feeding at least three threads thereto in plating relation, and means for knitting plated fabric from said threads, thread engaging instruments associated with the needles, means for moving certain instruments to hold one thread away from the others to the front of the needle hooks, and means for moving certain instruments to hold said thread and another away from the remainder to the front of the needle hooks.

15. In an independent needle knitting machine, a needle bed, needles reciprocatably mounted therein, means for feeding three threads in plating relation to the needles to be knitted thereby into plated fabric, movable plating instruments each allocated to a needle, and means for moving certain instruments to make a change in the plating relation by receiving one fed thread upon them but to miss the others, and for moving certain instruments to make a further change in the plating relation by receiving said fed thread and one other thread upon them but to miss the other, whereby three threads are brought in turn to the face of the fabric.

16. An independent needle knitting machine, having a tricked needle cylinder, needles mounted therein, means for feeding three threads in plating relation and at different heights to the needles, means for causing said needles to take and knit the three threads into plated fabric, a plating instrument in each needle trick, said instrument having a forwardly curved attenuated tip movable alongside the needle head, means for projecting certain instruments to positions whereat they receive the lowest fed thread across the front of their tips, means for retracting said instruments, substantially in unison with the associated needles, to miss the other two threads but to force said one thread towards the front of the needle hooks during the draw, means for projecting certain instruments to positions whereat they receive the two lowest fed threads across the front of their tips, means for retracting said instruments, substantially in unison with the associated needles, to miss the other thread but to force said two threads—while maintaining their vertical relation—towards the front of the needle hooks during the draw, and patterning means for selecting the instruments to be projected as aforesaid or not to be projected, whereby each thread in turn may be brought to the face of the fabric.

17. For a knitting machine having needles, means for feeding at least three yarns to them in plating relation, and means for knitting upon said needles plated fabric from the fed threads, each loop of which fabric contains at least three threads, reverse plating mechansim comprising a series of instruments for cooperating with the needles and determining the plating relation of the threads, and selective means for effecting selections from among the instruments and for moving selected instruments to lie alongside the hooks and to receive upon them a selected proportion of the fed threads and for moving other selected instruments to lie alongside the hooks to receive upon them a different proportion of the fed threads, and thereby to hold selected threads to the front of the needle hooks according to the desired eventual location of the threads in the knitted fabric.

18. In a knitting machine having needles, elements between said needles over which elements loops, joining the needle-loops, are formed in knitting, means for feeding a plurality of threads in plating relation to the needles, and means for moving the needles in relation to said elements to knit plated fabric from the threads, said needles in their movements sinking below the elements, reverse plating mechanism comprising thread-engaging instruments associated with the needles for controlling the plating relation of the threads during loop formation, and means for causing the instruments to accompany the needles in their movement below the aforesaid elements and to perform their thread-engaging and controlling functions while so sunk below the elements.

19. A circular knitting machine having a needle cylinder, latch needles movably mounted therein, means for feeding to the needles a plurality of threads in plating relation which means are such that the threads are fed at differing angles, one thread above the other, whereby the lower thread normally appears at the face of the fabric, elements between the needles, over which elements said needles draw their connecting sinker loops, instruments, at least one to each needle whereat the relation of the threads is to be changed to bring a thread other than the lower thread to the face of the fabric, which instruments have operative thread-engaging extremities pointing alongside the needle stems towards the needle heads and movable longitudinally towards and away from said heads, means for moving each instrument whereat a reversal of plating is required to an operative position alongside the head of the associated needle in which position the lower thread is laid across the front edge of the operative extremity and is subsequently enclosed between the closing latch and the said front edge in knitting but an upper thread is missed by said extremity and is laid direct in the hook, means for causing the needles to take and knit the said upper and lower threads, means for maintaining the extremity of each said instrument in a position whereat, as the associated needle knits, the lower thread is held to the front of the hook and is thereby brought to the rear of the fabric to expose an upper thread at the face, and means for withdrawing the extremity of each said instrument from its position between the threads before the associated needle knits again.

JOHN HOWARD BOOTON.
HERMAN BOOTON.